Patented Dec. 11, 1934

1,983,541

UNITED STATES PATENT OFFICE 1,983,541

MANUFACTURE OF ACETIC ANHYDRIDE

Harry Hepworth, Cheam, and Fred Davison Leicester, St. Helens, England, assignors to Imperial Chemical Industries Limited, a corporation of Great Britain No Drawing. Application July 7, 1930, Serial No. 466,348. In Great Britain July 4, 1929

4 Claims. (Cl. 260—123)

(Granted under the provisions of sec. 14, act of March 2, 1927; 357 O. G. 5)

This invention relates to improvements in the manufacture of acetic anhydride, and more particularly to a process involving the pyrogenic decomposition of acetic acid vapor.

The separation of acetic anhydride, acetic acid and water is a particularly difficult problem, and although it has been proposed to use active carbon for the separation of water from acetic acid alone, we believe that the application of active carbon in the present process as hereinafter described for the production of acetic anhydride from a mixture of the anhydride, acetic acid and water is new.

This invention has as an object a process of manufacturing acetic anhydride by an improved process of separating the acetic anhydride from a mixture of acetic acid, steam and acetic anhydride as, for instance, from the mixture obtained from the pyrogenic decomposition of acetic acid.

These objects are accomplished by the following process in which the mixed vapors resulting from the pyrogenic decomposition of acetic acid are passed over a solid adsorbent which permits the water vapor to pass through while retaining substantially all the acetic anhydride and acetic acid; treating the adsorbent to expel a portion of acetic acid therefrom, and then further treating the adsorbent to expel the mixture of acetic anhydride and acetic acid retained by the adsorbent, and then fractionating this last obtained mixture by any of the known processes for the separation of the acetic anhydride from the acetic acid.

According to our invention, we effect pyrogenic decomposition of acetic acid vapor in any suitable manner and then pass the products of the decomposition over active carbon which retains the acetic anhydride, together with the undecomposed acetic acid while the water passes on. The gases are preferably passed over the active carbon at a temperature just above the boiling point of the anhydride. Once the adsorption has begun heat is liberated thereby and cooling may be required.

The mixed anhydride and acetic acid retained by the carbon are then expelled by heating under reduced pressure, whereupon the acetic acid distills off first. The product may be fractionated if necessary. If desired the expulsion may be assisted by the use of an agent such as an inert gas, or an expulsion agent such as ethyl acetate which can readily be separated by fractional distillation.

The following example is illustrative of a preferred mode of procedure for carrying out our invention: The gaseous mixture, resulting from the pyrogenic decomposition of acetic acid, containing 45.6% by weight of acetic anhydride, 45.2% by weight of acetic acid and 9.2% by weight of steam was passed over 270 grams of dry activated charcoal contained in an aluminium U-tube maintained at a temperature of 140° C. Under these conditions the charcoal takes up its own weight of a mixture of acetic acid and acetic anhydride, while the water containing a small amount of acetic acid (1.5% by weight) passes through almost completely unadsorbed.

It is found to be advantageous, however, to stop the passage of the mixture of anhydride, acetic acid and water vapor before complete saturation of the charcoal has been reached. In the present example the passage of the vapor was stopped when the charcoal was only half saturated; this point being reached when 150 grams of the mixture of anhydride, acetic acid and water had been passed into the charcoal, and 11 grams of water containing 0.16 gram of acetic acid had passed completely through the charcoal.

The pressure existing in the U-tube was now slowly reduced to 10" Hg and the temperature was raised to 150° C. whereupon, the first fraction of 53.5 grams obtained, contained 96.5% acetic acid and 3.5% water. The pressure was now reduced to 1" Hg and the temperature raised to 300° C. which yielded a second fraction of 78 grams of a mixture of 44.5 grams of acetic anhydride and 33.5 grams of acetic acid. Thus this second fraction contains 57% by weight of acetic anhydride and is free from the water originally present. It also contains 65% of the anhydride present in the original mixture. The mixture of anhydride and acetic acid obtained by the second heating under reduced pressure may be fractionated and separated by any of the usual methods into its constituents for the production of the acetic anhydride.

It will be seen that the present process provides an effective and efficient means for the separation of acetic anhydride from a mixture containing the anhydride, acetic acid and water. Not only is the water eliminated from the mixture, but also a large fraction of the acetic acid is separated which leaves a final mixture rich in acetic anhydride from which the acetic anhydride may be economically separated.

As many apparently widely different embodiments of this invention may be made without departing from the spirit and scope thereof, it is to be understood that we do not limit ourselves to the specific embodiments thereof except as defined in the appended claims.

We claim:

1. The method of manufacturing acetic anhydride which comprises the separation of water from a vapor containing acetic anhydride, acetic acid and steam by contacting the mixed vapors at a temperature above the boiling point of the acetic anhydride with a solid adsorbent, expelling a portion of the acetic acid from the adsorbent, thereafter expelling the mixture of the anhydride and acid from the adsorbent, and then separating the acetic anhydride from the mixture.

2. The process set forth in claim 1 in which said solid adsorbent is active carbon.

3. The method of manufacturing acetic anhydride which comprises passing the mixed vapors of acetic anhydride, acetic acid and steam over heated active carbon at a temperature above the boiling point of the acetic anhydride, heating the active carbon under reduced pressure to expel a portion of the acetic acid with retention of substantially all of the acetic anhydride, heating the adsorbent under further reduced pressure to expel the mixture of acetic anhydride and acetic acid contained in the adsorbent, and separating the acetic anhydride from the mixture.

4. The method of manufacturing acetic anhydride which comprises passing a vapor containing a mixture of acetic anhydride, acetic acid and steam over active carbon heated to about 140° C., heating the carbon under a pressure of about 10" mercury at a temperature of about 150° C. to expel a portion of the acetic acid, heating the carbon under a pressure of about 1" mercury at a temperature of about 300° C. to expel the mixture of acetic anhydride and acetic acid contained in the carbon, and separating the acetic acid from the mixture.

HARRY HEPWORTH.
FRED DAVISON LEICESTER.